United States Patent [19]
Pirner

[11] 3,869,802
[45] Mar. 11, 1975

[54] GAUGING APPARATUS
[75] Inventor: Hans G. Pirner, Hubbardston, Mass.
[73] Assignee: The Gillette Company, Boston, Mass.
[22] Filed: Sept. 14, 1973
[21] Appl. No.: 397,263

[52] U.S. Cl. ................................. 33/174 L, 33/1 N
[51] Int. Cl. ............................................. G01b 7/30
[58] Field of Search........... 33/174 C, 174 E, 174 L, 33/174 PA, 174 Q, 1 N, 1 PT, DIG. 5

[56] References Cited
UNITED STATES PATENTS

| | | | |
|---|---|---|---|
| 2,637,116 | 5/1953 | Wiebe | 33/174 L |
| 3,056,209 | 10/1962 | Oliver | 33/174 L |
| 3,573,444 | 4/1971 | Kawabata et al. | 33/174 L |
| 3,606,687 | 9/1971 | Richardson | 33/174 L |

FOREIGN PATENTS OR APPLICATIONS
630,173  5/1936  Germany ........................ 33/174 E Primary Examiner—Richard E. Aegerter
Assistant Examiner—Richard R. Stearns

[57] ABSTRACT

Apparatus for measuring the angular offset of one portion of a structure relative to another portion of the structure includes two displacement-sensitive transducers disposed so as to sense the positions of two points on the structure; a third displacement-sensitive transducer disposed so as to sense the position of another point on the structure; a first comparator for computing the difference between the outputs of the first two transducers; a second comparator for computing the difference between the outputs of the third transducer and the first comparator; and a calibrator for weighing the inputs of one of the comparator devices in accordance with trigonometric relation of the sensed points.

13 Claims, 6 Drawing Figures

GAUGING APPARATUS

SUMMARY OF INVENTION

This invention relates to a gauging apparatus and more particularly to a gauging system that measures and indicates directly the angle by which a first surface of a compact structure is offset relative to a second planar surface of that structure.

It is often desired to measure with a high degree of accuracy the angle by which one surface of a structure is offset relative to another planar surface of that structure. When the structure is small in size, accurate mechanical or visual measurement is difficult. An example of this problem occurs in the manufacture of razor blades where it is desired to measure the angular position of the grind facet relative to the body of the razor blade be established within a very small tolerance.

It is an object of this invention to provide apparatus for measuring accurately the angular offset of one portion of a structure relative to another portion of that structure. It is another object of this invention to provide novel and improved apparatus for measuring angles of this kind in compact structures. It is also an object of this invention to provide apparatus of this kind in which the measurement is made and indicated directly. It is a further and more specific object of this invention to provide apparatus for verifying directly and accurately the angle by one portion of a razor structure is offset relative to another surface of the structure.

In accordance with principles of the invention there is provided a gauging system that includes three transducers, two of which are disposed so as to sense the positions of two points lying on a first portion of the structure relative to which the angular offset is measured, and the third of which is disposed so as to sense the position of another portion that is angularly offset from that first portion. The gauging system also includes a comparator device for computing the difference between the outputs of the first two transducers, this difference representing the amount of tilt between the first portion and a reference plane defined by equal outputs from these two transducers; and a second comparator device for computing the difference between the output from the third transducer and the differential output from the first two transducers. This latter difference represents the measured angular offset. A calibration factor is preferably generated to reflect the relative arithmetic influences of the effective tilt of the first portion and the displacement of the offset portion, which relative influences are dependent upon the relative distances between the three points whose positions are sensed. An indicator device may directly display the measured angular offset.

In a particular embodiment of this invention there is provided a gauging system that includes three low-voltage differential-transformer type gauges (LVDT's) for sensing the positions of two points on a first surface of, and a third point on an angularly offset surface of the structure to be gauged. A current-differential circuit is included for computing the difference between the outputs of the first two gauges, and a potentiometer and amplifier are included for calibrating the output of the current-differential circuit. A second current-differential circuit is provided for computing the difference between the output from the third gauge and the calibrated differential output from the first two gauges. An ammeter is included for displaying the measured angular offset.

Other objects, features and advantages of this invention will be seen from the following description of a particular embodiment thereof taken in conjunction with the accompanying drawings in which.

DESCRIPTION OF PARTICULAR EMBODIMENT

Figure 1:
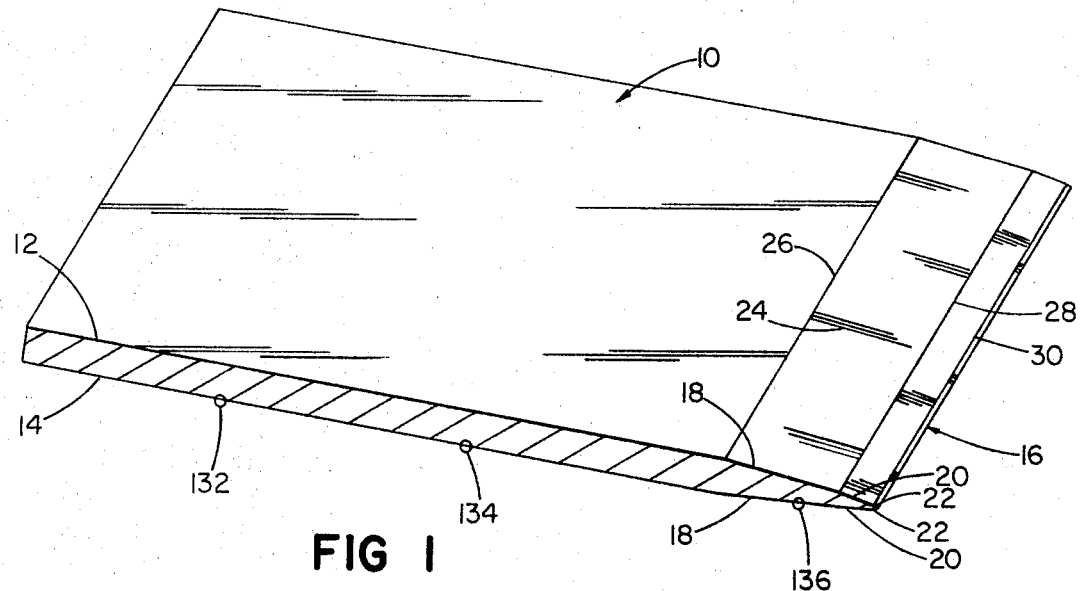
FIG. 1 is a perspective cross-sectional view of a razor blade indicating the dimensional relation to be measured by a gauging system constructed in accordance with the invention.

The razor blade shown in FIG. 1 includes a body 10 that includes planar upper and lower surfaces 12, 14 spaced apart 0.01 inch. A cutting edge 16 is defined by grind facets 18, rough hone facets 20 and finish facets 22. Grind marks 24 on the grind facet terminate along a distinct line 26 and enable the intersection between the blade body 10 and the grind facet to be readily identified under microscopic inspection (at a magnification of about 100X, for example). The difference between grind marks on the rough hone facet and the finish hone facet similarly enable the facet intersections 28, 30 to be identified.

In the manufacture of razor blades and other components it is desirable to monitor a particular angular relationship such as the angular position of the grind facet 18 at several points along the length of the blade. However, the blade presents gauging problems. It is about 1½ inches long and slightly less than one-half inch wide; and the grind facet 18 is typically about 0.03 inch wide and disposed at an angle of about 6° to the blade body. The rough hone facet 20 extends about 0.01 inch from the ultimate edge 16 and is disposed at an angle of about 7½° to the blade body.

Details of gauging apparatus constructed in accordance with the invention for measuring this component may be seen with reference to FIGS. 2–5. The gauging unit includes housing 70 which has an aperture 72 in a top wall 74 through which a blade 10 may be inserted for positioning on translatable support 76. Hold down member 92 clamps the blade 10 on support 76. Meter 78 mounted on the unit is calibrated in degrees and provides a direct indication of the angular offset of a point of interest, e.g. grind facet 18, relative to the plane defined by two points on the blade body 10.

Figure 3:
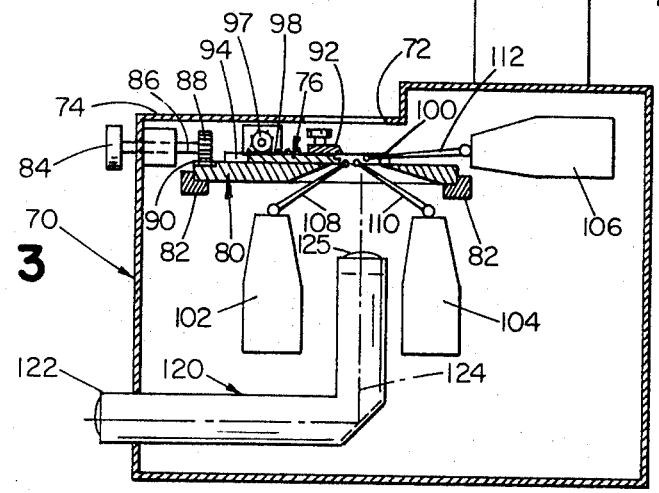
FIG. 3 is a diagrammatic end view taken generally along the line 3—3 of FIG. 4 of the gauging system shown in FIG. 2 indicating the relation of transducers and support structure.
Figure 4:
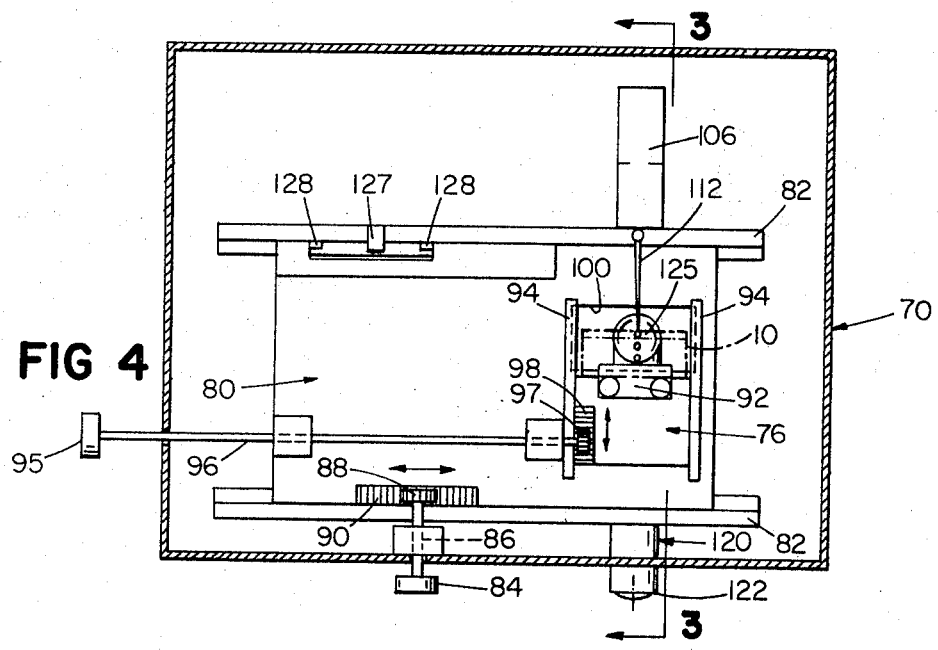
FIG. 4 is a top diagrammatic view with parts broken away showing additional details of the relation of the support structure and transducers.

As shown in FIGS. 3 and 4, the gauging system includes a support member 80 mounted for transverse movement on bearing supports or ways 82 and is translated by rotation of knob 84 which drives shaft 86 and pinion gear 88 that engages rack gear 90 carried by slide 80. Adjacent aperture 100 in support member 80 is disposed longitudinally movable support 76. That support slides on ways 94 and is driven by knob 95 which drives shaft 96 and pinion gear 97 that engages rack gear 98.

Three LVDT's (low voltage differential transformers) 102, 104, 106 are also supported within enclosure 70. Each transducer has a displacement arm 108, 110, 112, respectively, at the end of which is a spherical tip 114, 116, 118, respectively. The system also includes optical system 120 diagrammatically indicated as including eyepiece 122, lens 125, and cross hairs or other suitable defining structure 126, all of which lie along optical axis 124. System 120 permits a blade on support 76 to be viewed at appropriate magnification and positioned by manipulation of knobs 84 and 95 so that intersection 26 is on the optical axis 124. Slide 76 may be moved transversely relative to sensing tips 114, 116, 118 by rotation of knob 84 so that a measurement at any point along its length may be obtained. Stop structure 127 fixed to way 82 cooperates with spaced stop members 128 carried by the translatable support 76 to limit the motion of that support relative to the transducers.

Figure 5:
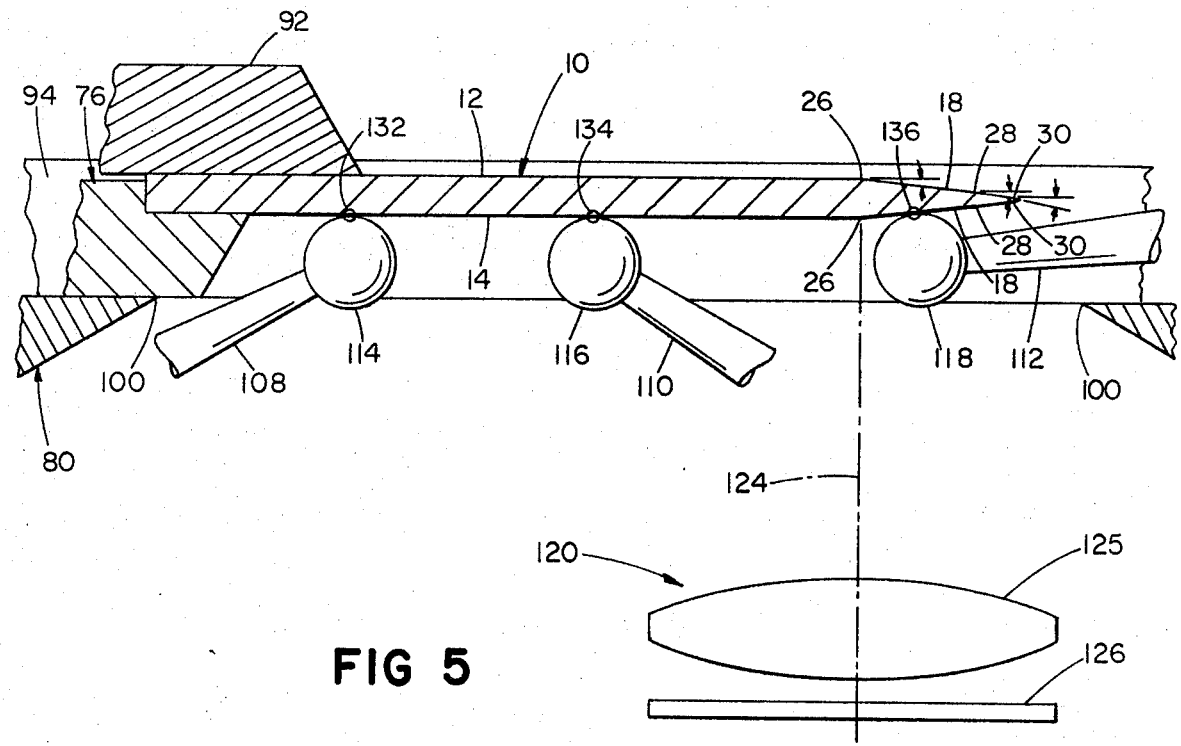
FIG. 5 is an enlarged view of the razor blade shown in FIG. 1 disposed on the support structure of the gauging system shown in FIG. 2 with the sensing tips of the three transducers in engagment with surfaces of the blade.
Figure 2:
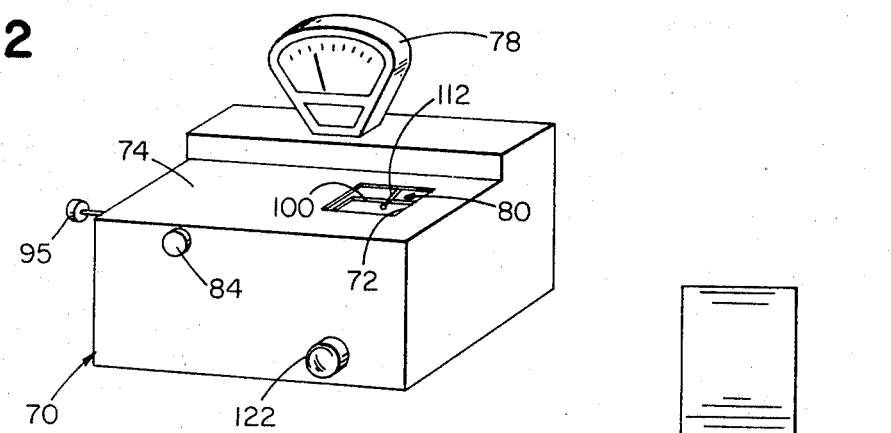
FIG. 2 is a perspective view of a gauging system constructed in accordance with the invention.

Additional details of the position of the gauging elements may be seen with reference to FIG. 5. Blade 10 is clamped on support 76. Support 76 is moved longitudinally until intersection 26 is aligned with optical axis 124. In this position, sensing tip 114 engages the blade body 10 at point 132; sensing tip 116 engages blade body 10 at point 134; and sensing tip 118 engages point 136 on grind facet 24. The blade is supported so that the lower facet surfaces thus are suspended in opening 100 so that the sensing tips 114, 116 and 118 are free to engage the grind facet and blade body surfaces as the slide 76 is translated relative to the transducers.

Figure 6:
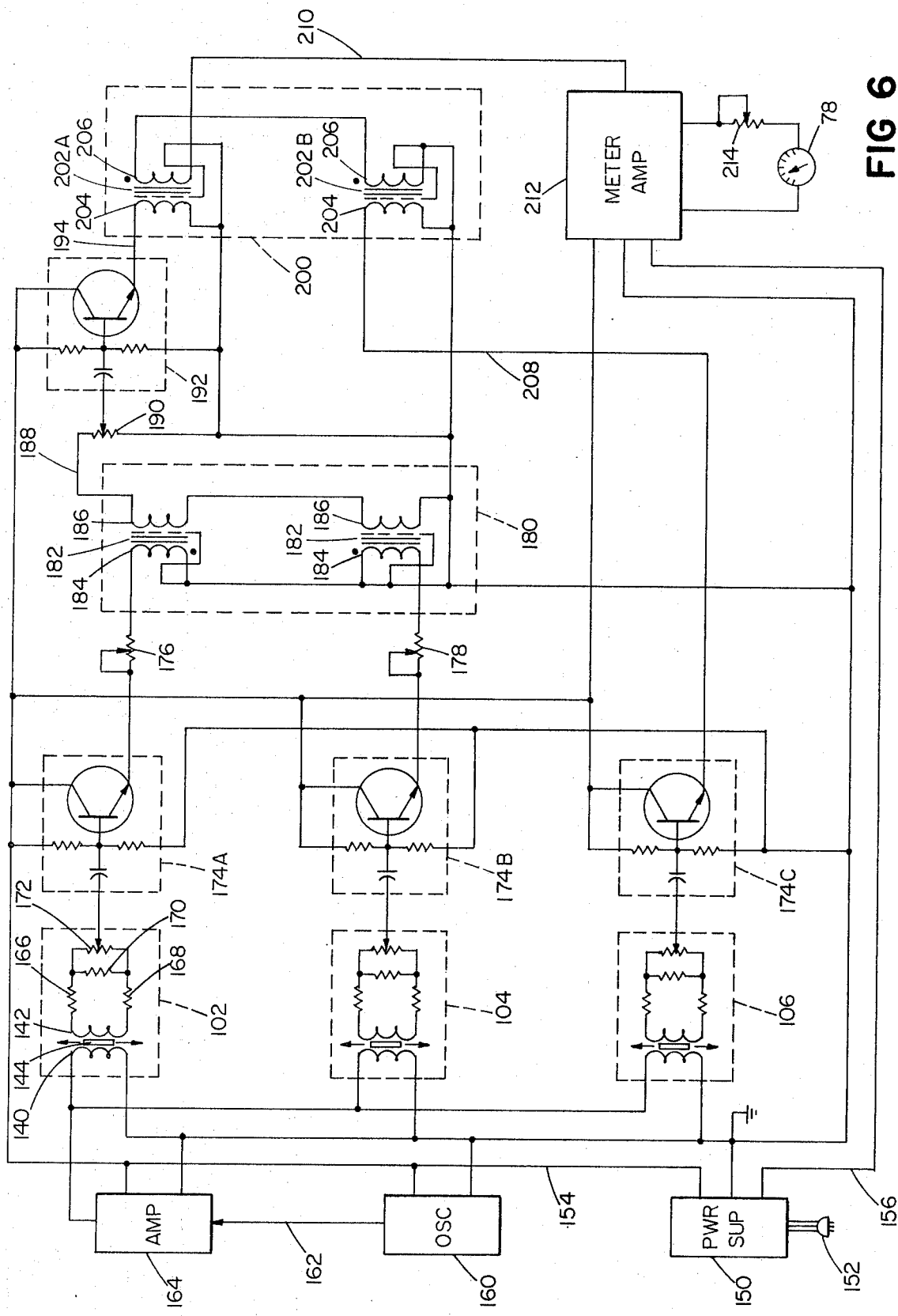
FIG. 6 is a circuit diagram, partly in schematic form and partly in block form, of circuitry employed in the gauging system shown in FIG. 2.

The three transducers 102, 104 and 106, as indicated in FIG. 6, are differential transformers and each includes a primary winding 140, a secondary winding 142 and a movable core 144 that is connected to and moved by the sensing arm 108, 110, 112, respectively. A power supply 150 arranged to be connected by plug 152 to a 220 volt three phase line provides an operating voltage of 18 volts AC over line 154 and an operating voltage of 18 volts AC over line 156. Line 154 is connected to oscillator circuit 160 which provides a 4.8 kilohertz output signal which is applied over line 162 to amplifier 164 whose output is connected to primary windings 140 of the differential transformer circuits. The secondary winding of each differential transformer is connected through a resistor network that includes fixed resistors 166, 168, 170 and calibrating potentiometer 172 to an emitter-follower circuit 174. The outputs of emitter-follower circuits 174a and 174b are applied through gain matching variable resistors 176, 178, respectively, to current differential circuit 180 that includes two matched transformers 182, each of which has a primary winding 184 and a secondary winding 186. The primary windings 184 are connected in parallel subtractive relation and the secondary windings 186 are connected in series to provide an output over line 188 and through potentiometer 190 to emitter-follower circuit 192. The output of emitter-follower circuit 192 is applied over line 194 as one input to a second current differential circuit 200 which also includes two matched transformers 202, each of which has a primary winding 204 and a secondary winding 206. The second input to current differential circuit 200 is applied from emitter-follower circuit 174c over line 208 to the primary winding 204 of the second transformer 202b. The secondary windings 206 of transformer 202a and 202b are connected in series opposition and the output is applied over line 210 to meter amplifier 212 whose output in turn is applied to indicator 78.

In operation, oscillator 160 and amplifier 164 provide a 4.8 kilohertz signal to primary windings 140 of differential transformers 102, 104 and 106 and induce signals in the secondary windings 112 of those transformers. The strength of the induced signals depends on the position of gauge arms 108, 110, 112 which are connected to the movable cores 144 of the transformers. When a razor blade 10 is supported on support 76 and arm tips 114, 116 and 118 engage the corresponding surfaces as indicated in FIG. 5, the output signals of the differential transformer circuits are proportional to the relative displacement of the sensing tips 114, 116, 118. Emitter-follower circuits 174 amplify these output signals; and current differential circuit 180 subtracts the amplified output signal of gauge circuit 102 from that of gauge circuit 104, the value of which is proportional to the amount by which tip 114 is displaced relative to tip 116 and effectively establishing a reference plane signal on line 188. Potentiometer 190 and emitter-followr 192 multiply this reference plane signal by a calibration factor chosen to reflect the arithmetic influence of the relative displacement of tips 114 and 116 in terms of the displacement of tip 118. The amplified output of gauge circuit 106 is applied over line 208 to current differential circuit 200 and subtracted from the calibrated reference plane signal on line 194. The output signal on line 210 provides a measure of the angular offset by point 136 relative to the plane defined by points 132 and 134 and is applied to amplifier 212 for display by meter 78 to provide a direct indication of that angular offset value. Support 76 is transversely movable by rotation of knob 84 so that the angular offset may be measured at any number of points along that grind surface.

Variable resistors 176, 178 allow the gains of transformers 102, 104 and their respective amplifiers 174 to be matched; potentiometers 172 permits independent adjustment of the zero positions from which the sensing tip displacements are measured; and variable resistor 214 allows calibration of meter 78.

Thus it will be seen that the invention enables accurate and direct measurement of the angular offset of one portion of a structure relative to another portion. It will be understood that the invention can be practiced with a variety of different systems including different types of displacement sensitive transducers, comparator devices, calibrators and their equivalents. Therefore, while a particular embodiment of the invention has been shown and described, it is not intended that the invention be limited to the disclosed embodiment or to details thereof and departures may be made therefrom within the spirit and scope of the invention as defined in the claims.

What is claimed is:

1. Apparatus for measuring the angular offset of one portion of an article relative to another portion of said article comprising:
   a base member, means for supporting said article for placing the apex of the angular offset thereof in a particular position, two displacement-sensitive transducers mounted on said base so as to sense the positions of two points lying on said another portion;

a third displacement-sensitive transducer mounted on said base as to sense the position of a point lying on said one portion;

a first comparator means for computing the difference between the outputs of the first two said transducers;

a second comparator means for computing the difference between the outputs of said third transducer and the first said comparator means; and a calibrator means for compensating for the arithmetic influence of the relative displacement of the transducers in accordance with the trigonometric relation of said sensed points.

2. Apparatus as claimed in claim 1 wherein said means for supporting said article and for placing the apex of said angular offset of said article in a particular position comprises reference structure against which said article is positioned during measurement of said angular offset, said structure being movable in a direction perpendicular to said apex.

3. Apparatus as claimed in claim 1 and further comprising an indicator for displaying the output of said second comparator means as an indication of the angular offset of said one portion relative to said another portion.

4. Apparatus as claimed in claim 3 wherein said indicator includes an ammeter whose scale is marked in degrees of angle for displaying the magnitude of said angular offset.

5. Apparatus as claimed in claim 3 wherein said transducers provide electrical output signals, said comparator means and calibrator means respond to electrical input signals and provide electrical output signals and said indicator responds to an electrical input signal.

6. Apparatus as claimed in claim 1 wherein said transducers are of the electromechanical type which respond to mechanical displacement and provide electrical output signals.

7. Apparatus as claimed in claim 1 wherein each said comparator means includes two matched transformers, the primary windings of which serve as inputs and the secondary windings of which are connected together in series to provide an output signal.

8. Apparatus as claimed in claim 1 wherein said calibrator means includes an attenuation potentiometer and an amplifier both connected between the output of said first comparator means and one input of said second comparator means.

9. Apparatus as claimed in claim 1 wherein said transducers are of the low-voltage differential-transformer type.

10. Apparatus as claimed in claim 9 wherein each said comparator means includes two matched transformers, the primary windings of which serve as inputs and the secondary windings of which are connected together in series to provide an output signal; and wherein said calibrator includes an attenuation potentiometer and an amplifier both connected between the output of the said first comparator means and one input of said second comparator means; and wherein said indicator includes an ammeter whose scale is marked in degrees of angle for displaying the magnitude of said angular offset; said apparatus further comprising potentiometer means for zero adjusting the outputs of said transducers, amplifiers means for boosting the output signals of said transducers and said comparator means, variable resistor means for matching the gains of said transducers and their respective amplifier means, and a variable resistor in series with said ammeter for adjusting the overall gain of said apparatus and thereby calibrating the range of said ammeter.

11. Apparatus as claimed in claim 10 wherein said means for supporting said article and for placing the apex of said angular offset of said article in a particular position comprises reference structure against which said article is positioned during measurement of said angular offset said means for supporting said article being movable in a direction parallel to said apex.

12. Apparatus as claimed in claim 10 wherein said means for supporting said article and placing the apex of the angular offset of said article in a particular position includes an optical system mounted on said base member for indicating when said apex is aligned with the axis of said optical system means for supporting said article with respect to said base Memtical system movable with respect to said base member for placing said article supported on said means for supporting said article in predetermined relation to said optical system.

13. A gauging system for measuring the angular offset of one portion of a component relative to another portion thereof comprising:

a base member support means including a positioning surface for receiving said component and positioning the apex of said angular offset in a particular position with respect to said base member, first and second mounted on said base member transducers to sense the positions of two points on said another portion, a first comparator means responsive to the output of said first and second transducers for establishing a reference plane signal as a function of the positions of said two points relative to said positioning surface, a third transducer mounted on said base member to sense the position of a point lying on said one portion, and a second comparator means responsive to the output of said first comparator means and the output of said third transducer for generating an output signal indicative of the angular offset of said one portion of the sensed component relative to said another portion of that component.

* * * * *

UNITED STATES PATENT OFFICE
CERTIFICATE OF CORRECTION

PATENT NO. : 3,869,802
DATED : March 11, 1975
INVENTOR(S) : Hans G. Pirner

It is certified that error appears in the above-identified patent and that said Letters Patent are hereby corrected as shown below:

Column 1, line 5, after "to" delete "a".
Column 4, line 5, change "transformer" to --transformers--;
        line 29, change "followr" to --follower--.
Column 5, line 1, after "article" insert --and--;
        line 3, add at end of line, --with respect to said base member--;
        line 8, after "base" add --member so--;
        line 25, change "structure" to --means for supporting said article--;
        line 26, change "perpendicular" to --parallel--.
Column 6, line 3, after "calibrator" insert --means--;
        line 11, change "amplifiers" to --amplifier--;
        line 30, after "system" insert --,said--;
        line 31, after "article" insert --being relatively movable--;
        lines 31-32, delete "Memtical system movable with respect to said base";
        line 42, after "second" insert --transducers--;
        line 43, delete "transducers".

Signed and sealed this 13th day of May 1975.

(SEAL)
Attest:

RUTH C. MASON
Attesting Officer

C. MARSHALL DANN
Commissioner of Patents
and Trademarks